(12) United States Patent
Zeng

(10) Patent No.: US 10,186,214 B2
(45) Date of Patent: Jan. 22, 2019

(54) DRIVING SYSTEM AND DRIVING METHOD OF LIQUID CRYSTAL DISPLAY DEVICE AND LIQUID CRYSTAL DISPLAY DEVICE

(71) Applicant: Shenzhen China Star Optoelectronics Technology Co., Ltd., Shenzhen, Guangdong (CN)

(72) Inventor: Dekang Zeng, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 158 days.

(21) Appl. No.: 15/112,126

(22) PCT Filed: May 26, 2016

(86) PCT No.: PCT/CN2016/083504
§ 371 (c)(1),
(2) Date: Jul. 15, 2016

(87) PCT Pub. No.: WO2017/181483
PCT Pub. Date: Oct. 26, 2017

(65) Prior Publication Data
US 2018/0108305 A1    Apr. 19, 2018

(30) Foreign Application Priority Data

Apr. 19, 2016    (CN) .......................... 2016 1 0242905

(51) Int. Cl.
*G09G 3/36*    (2006.01)
*G09G 3/20*    (2006.01)
*G02F 1/1333*    (2006.01)

(52) U.S. Cl.
CPC ......... *G09G 3/3607* (2013.01); *G02F 1/1333* (2013.01); *G09G 3/2074* (2013.01);
(Continued)

(58) Field of Classification Search
CPC .. G09G 3/3607; G09G 3/3651; G09G 3/3614; G09G 3/2074; G02F 1/1333
See application file for complete search history.

(56) References Cited

U.S. PATENT DOCUMENTS

| | | | | |
|---|---|---|---|---|
| 2007/0018919 | A1* | 1/2007 | Zavracky | G09G 3/3406 345/87 |
| 2011/0221787 | A1* | 9/2011 | Choi | G09G 3/2074 345/690 |

(Continued)

FOREIGN PATENT DOCUMENTS

| | | |
|---|---|---|
| CN | 1909053 A | 2/2007 |
| CN | 101059946 A | 10/2007 |

(Continued)

*Primary Examiner* — Andrew Sasinowski
(74) *Attorney, Agent, or Firm* — Andrew C. Cheng

(57) ABSTRACT

The present disclosure discloses a driving system of LCD, which includes: a timing control circuit is used to storage a data converted to gamma voltage; a data driving circuit for receiving the data converted to gamma voltage and the data converted to pixel gray reference voltage from the timing control circuit is used to convert the data converted to gamma voltage and the data converted to pixel gray reference voltage to a gamma voltage and a pixel gray reference voltage respectively and is used to obtain a pixel gray voltage by the converted gamma voltage gamma correct to the converted pixel gray reference voltage. The present disclosure further discloses a driving method and a device thereof. When the LCD device of the present disclosure is capable of performing gamma correction, the P-Gamma circuit will be omitted, greatly reducing the cost of production, so as to enhance the market competitiveness.

4 Claims, 3 Drawing Sheets

(52) U.S. Cl.
CPC ............. *G09G 3/36* (2013.01); *G09G 3/3614* (2013.01); *G09G 3/3651* (2013.01)

(56) References Cited

U.S. PATENT DOCUMENTS

| | | | |
|---|---|---|---|
| 2013/0069717 A1* | 3/2013 | Kim | G09G 3/36 330/9 |
| 2014/0160171 A1 | 6/2014 | Yang | |

FOREIGN PATENT DOCUMENTS

| | | |
|---|---|---|
| CN | 101226289 A | 7/2008 |
| CN | 101458907 A | 6/2009 |
| CN | 101847358 A | 9/2010 |
| CN | 101123075 B | 5/2012 |
| CN | 102568421 A | 7/2012 |
| CN | 103839530 A | 6/2014 |
| CN | 104464678 A | 3/2015 |
| CN | 104751817 A | 7/2015 |

\* cited by examiner

DRIVING SYSTEM AND DRIVING METHOD OF LIQUID CRYSTAL DISPLAY DEVICE AND LIQUID CRYSTAL DISPLAY DEVICE

FIELD OF THE DISCLOSURE

The present disclosure relates to a liquid crystal display technology field, and more particularly to a driving system and a driving method of liquid crystal display device and a liquid crystal display device.

BACKGROUND OF THE DISCLOSURE

With the evolution of optical and semiconductor technology, has led to a flat panel display (Flat Panel Display) to flourish, and in many flat panel displays, LCD (Liquid Crystal Display, referred to as the LCD) because of its high space utilization efficiency, many superior characteristics of low power consumption, no radiation and low electromagnetic interference, has been used in all aspects of production and life.

The conventional liquid crystal display (LCD) driving system typically includes a programmable gamma (P-Gamma) circuit. The P-Gamma circuit generating a gamma voltage, the gamma voltage can be supplied to the data driving circuit for gamma correcting the pixel gray reference voltage generated by the data driving circuit to obtain a pixel gray voltage. The pixel gray reference voltage is provided for driving each pixel.

Then, the existing manufacture of the P-Gamma circuit is more complex and costly. Therefore, how to provide a driving system omitting P-Gamma circuit and enable to processing the gamma correction is a technical issue needed to resolve in the liquid crystal display device.

SUMMARY OF THE DISCLOSURE

To solve the above technical problems, object of the present disclosure is to provide a driving system of the liquid crystal display device, which includes: a timing control circuit for storing a data converted to gamma voltage is used to generate a data converted to pixel gray reference voltage; a data driving circuit for receiving the data converted to gamma voltage and the data converted to pixel gray reference voltage from the timing control circuit is used to convert the data converted to gamma voltage and the data converted to pixel gray reference voltage to a gamma voltage and a pixel gray reference voltage respectively and is used to obtain a pixel gray voltage by the converted gamma voltage gamma correct to the converted pixel gray reference voltage.

Further, the timing control circuit includes: a storage module for storing the data converted to gamma voltage; a timing control module for processing an input image signal received from an external graphics controller to generate the data converted to pixel gray reference voltage.

Further, the data driving circuit includes: a first line storage module for storing the data converted to pixel gray reference voltage received from the timing control circuit; a second line storage module for storing the data converted to gamma voltage received from the timing control circuit; a D/A converter module for converting the data converted pixel gray reference voltage and the data converted gamma voltage to the pixel gray reference voltage and the gamma voltage is used to obtain the pixel gray voltage by the converted gamma voltage gamma correct to the converted pixel gray reference voltage.

Further, the data driving circuit further includes: an operational amplifier module for enlarging the pixel gray voltage is used to output the amplified pixel gray voltage.

Further, the data is transported between the timing control circuit and the data driving circuit through an IIC communication protocol.

Another object of the present disclosure further provides a driving method of the liquid crystal display device, which includes: storing a data converted to gamma voltage and generating a data converted to pixel gray reference voltage; converting the data converted to gamma voltage and the data converted to pixel gray reference voltage to a gamma voltage and a pixel gray reference voltage respectively; obtaining a pixel gray voltage by the converted gamma voltage gamma correct to the converted pixel gray reference voltage.

Further, the specific method for generating the data converted to the pixel gray reference voltage includes: receiving an input image signal and processing the input image signal to generate the data converted pixel gray reference voltage.

Further, after obtaining the pixel gray voltage, the received pixel gray voltage is enlarged and the pixel gray voltage after enlarging is outputted.

Further, transporting the data through the IIC communication protocol.

The other object of the present disclosure is provides a liquid crystal display device, which includes the above driving system or using the above driving method to driving the display.

The beneficial effects of the present disclosure is: when a liquid crystal display device of the present disclosure is capable of performing gamma correction, the P-Gamma circuit will be omitted, greatly reducing the cost of production, so as to enhance the market competitiveness.

BRIEF DESCRIPTION OF THE DRAWINGS

The following description in conjunction with the accompanying drawings, the above and other aspects, features and advantages of embodiments of the present disclosure will become more apparent from the accompanying drawings.

DETAILED DESCRIPTION OF PREFERRED EMBODIMENTS

Figure 1:
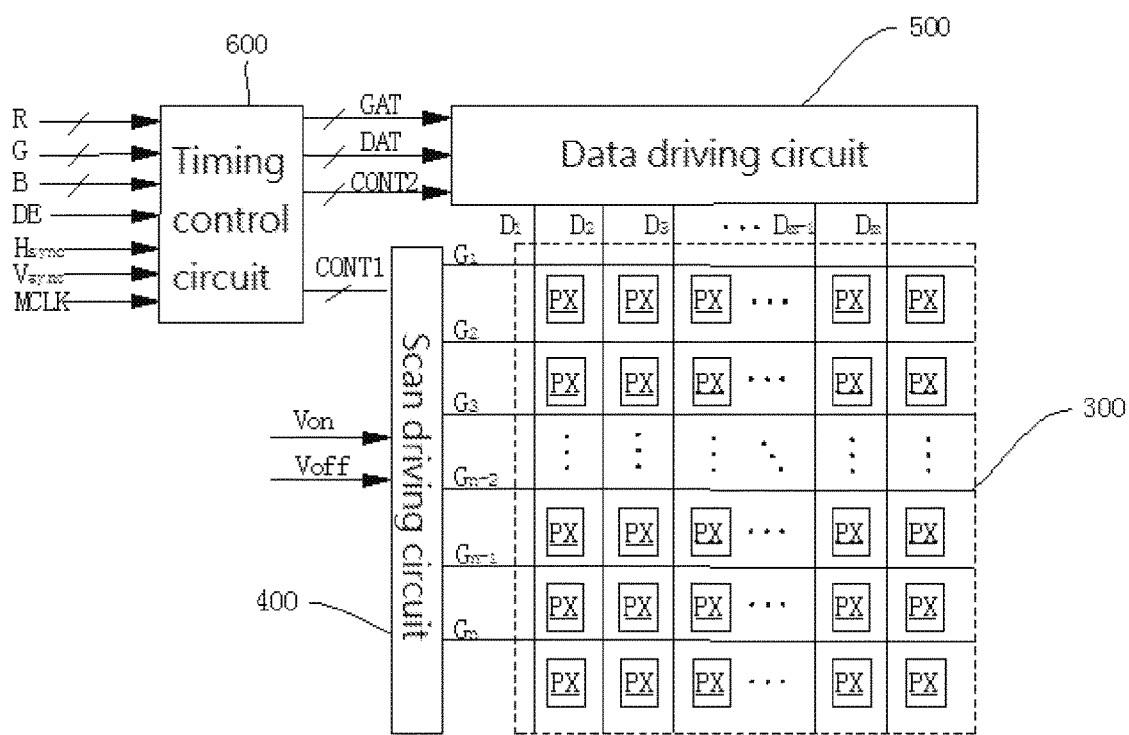
FIG. 1 is a block diagram of the LCD device of the embodiment of the present disclosure.

Hereinafter, embodiments of the present disclosure will be described in detail with reference to the accompanying drawings. However, in many different forms and embodiments of the present disclosure, and the disclosure should not be construed as limited to the specific embodiments set forth herein. Rather, these embodiments are provided to explain the principles of the disclosure and its practical application so that others skilled in the art to understand the disclosure for various embodiments and various modifications suited to the particular intended application.

In the drawings, the device for clarity, exaggerated thickness of layers and regions. The same reference numerals in the drawings refer to like elements throughout.

It will be understood that, although the terms "first", "second", etc. may be used herein to describe various elements, these elements should not be limited by these terms. These terms are only used to distinguish one element from another separate.

FIG. 1 is a block diagram of the LCD device of the embodiment of the present disclosure.

Refer to FIG. 1, the liquid crystal display device of the embodiment of the present disclosure includes: a liquid crystal panel assembly 300; a scan driving circuit 400 and a data driving circuit 500, both are connected to the liquid crystal panel assembly 300; and a timing control circuit 600 for controlling the liquid crystal panel assembly 300, the scan driving circuit 400 and the data driving circuit 500.

The liquid crystal panel assembly 300 includes a plurality of display signal lines and a plurality of pixels PX connected to the display signal line and arranged in the array. The liquid crystal panel assembly 300 can includes: a lower display panel (not shown) and an upper display panel (not shown) facing each other and a liquid crystal layer (not shown) inserted between the lower display panel and the upper display panel.

The display signal line may be arranged on the lower display panel. The display signal line can includes a plurality of scan lines G1 to Gn for transporting the scan signal and a plurality of data lines D1 to Dm for transporting the data signal. The scan lines G1 to Gn are extended alone the row direction and substantially parallel to each other and the data lines D1 to Dm are extended alone the column direction and substantially parallel to each other Each pixel PX includes: a switching device connecting to the corresponding scan line and the corresponding data line; and a liquid crystal capacitor connecting to the switching device. If necessary, each pixel PX may include a storage capacitor connected in parallel with the liquid crystal capacitor.

Each pixel PX switching device is a three-terminal device, has a control terminal connected to the corresponding scan line, an input terminal connected to the corresponding data line and a output terminal connected to the corresponding liquid crystal capacitor.

The scan driving circuit 400 connects to the scan lines G1 to Gn and applied the scan signal to the scan lines G1 to Gn, the scan signal is a composition of the gate-on voltage Von and the gate-off voltage Voff of the scan driving circuit 400 provided by an external source. Refer to FIG. 1, the scan driving circuit 400 is arranged one side of the liquid crystal panel assembly 300, and the scan lines G1 to Gn are connect to the scan driving circuit 400. However, the present disclosure is not limited thereto. That is, a scan driving circuit is arranged both sides corresponding to the liquid crystal panel assembly 300 respectively, and the scan lines G1 to Gn are connect to each of these two scan driving circuits.

The data driving circuit 500 connects to the data lines D1 to Dm of the liquid crystal panel assembly 300 and applies the pixel gray voltage to the pixel PX.

The timing control circuit 600 controls the operation of the scan driving circuit 400 and the data driving circuit 500.

A plurality of input control signals of the timing control circuit 600 storing the data converted to gamma voltage GAT, receiving the input image signal (R, G and B) from the external graphics controller (not shown) and controlling the display of the input image signal, for example, a vertical synchronization signal Vsync, a horizontal synchronization signal Hsync, a main clock signal MCLK, a data enable signal DE. The timing control circuit 600 is suitably processed input image signal (R, G and B) according to the input control signal, thereby generating the data converted to pixel gray reference voltage DAT of the operation conditions of the liquid crystal panel assembly 300. Then, the timing control circuit 600 generates a gate control signal CONT1 and a data control signal CONT2, the gate control signal CONT1 transports to the scan driving circuit 400, and the data control signal CONT2, the data converted to gamma voltage GAT and the data converted to pixel gray reference voltage DAT transport to the data driving circuit 500.

The gate control signal CONT1 may include: a scan start signal STV for starting the operation of the scan driving circuit 400, i.e. scanning operation; and at least one clock signal for controlling when the gate-on voltage Von output. The gate control signal CONT1 may include an output enable signal OE for limiting the duration of the gate-on voltage Von. The clock signal can be used as a selection signal SE.

The data control signal CONT2 may include: a horizontal synchronization start signal STH for indicating the transmission of the data converted to pixel gray reference voltage DAT and the data converted to gamma voltage GAT; a load signal LOAD for requesting apply the pixel gray voltage obtained according to the data converted to pixel gray reference voltage DAT and the data converted to gamma voltage GAT to the data lines D1 to Dm; and a data clock signal HCLK.

The data driving circuit 500 in responses to the data control signal CONT2 receiving the data converted to pixel gray reference voltage DAT and the data converted to gamma voltage GAT from the timing control circuit 600, converts the data converted to pixel gray reference voltage DAT and the data converted to gamma voltage GAT to the pixel gray reference voltage and the gamma voltage, and uses the gamma correction by the converted gamma voltage and the converted pixel gray reference voltage to obtain the pixel gray voltage.

Further, the data driving circuit 500 enlarges the obtained pixel gray voltage, and provides the enlarged pixel gray voltage to the data lines D1 to Dm.

The scan driving circuit 400 conducts the switching device connected to the scan lines G1 to Gn by in response to the gate control signal CONT1 applies the gate-on voltage Von to the scan lines G1 to Gn. Then, the pixel gray voltage provided to the data lines D1 to Dm through the conducting switching device is transmitted to each of the pixels PX.

The arrangement of the liquid crystal molecules in the liquid crystal layer is changed according to the magnitude of the pixel gray voltage, and therefore the polarity of the light transported by the liquid crystal layer may also vary, resulting in the change of the transmittance of the liquid crystal layer.

Figure 2:
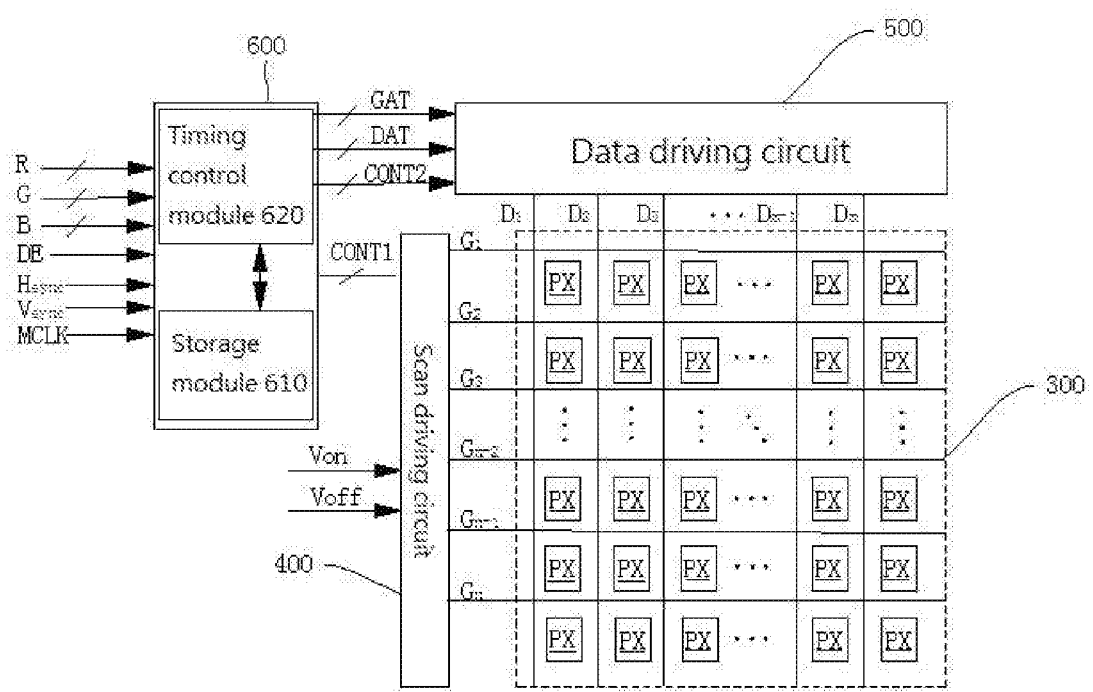
FIG. 2 is a module diagram of the timing control circuit of the embodiment of the present disclosure.

FIG. 2 is a module diagram of the timing control circuit of the embodiment of the present disclosure.

Refer to FIG. 2, the timing control circuit 600 according to the embodiment of the present disclosure includes: a storage module 610 and a timing control module 620.

The storage module 610 is used to storage the data converted to gamma voltage GAT. In the present embodiment, the storage module may be an electrically erasable programmable read-only memory (EEPROM), however, the present disclosure is not limited thereto.

The timing control module 620 receives the input image signal (R, G and B) from the external graphics controller, controls a plurality of input control signals of the display of the input image signal, and appropriate processes the input image signal according to the input control signal to generate the data converted to pixel gray reference voltage DAT.

Figure 3:
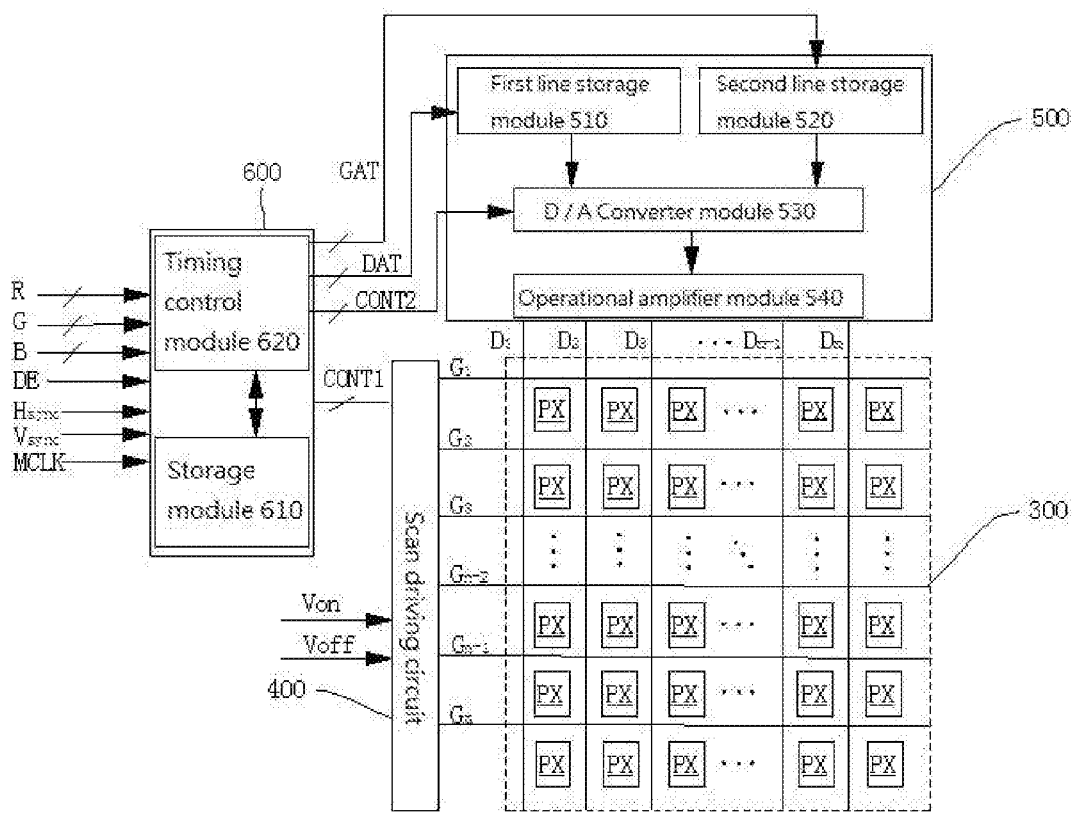
FIG. 3 is a module diagram of the data driving circuit of the embodiment of the present disclosure.

FIG. 3 is a module diagram of the data driving circuit of the embodiment of the present disclosure.

Refer to FIG. 3, the data driving circuit 500 according to the embodiment of the present disclosure includes: a first line storage module 510, a second line storage module 520, a D/A converter module 530 and an operational amplifier module 540.

In the present embodiment, the data driving circuit 500 and the timing control circuit 600 are transport the data by the IIC communication protocol, thus, if necessary, the data driving circuit 500 may also include a logical module of IIC protocol (not shown).

The first line storage module 510 is used to storage the data converted to pixel gray reference voltage DAT received from the timing control circuit 600. The second line storage module 520 is used to storage the data converted to gamma voltage GAT received from the timing control circuit 600. If necessary, the first line storage module 510 and the second line storage module 520 can be combined into a line storage module.

The D/A converter module 530 is used to convert the data converted to pixel gray reference voltage DAT and the data converted to gamma voltage GAT to the pixel gray reference voltage and the gamma voltage. The D/A converter module 530 is obtained the pixel gray voltage by the converted gamma voltage gamma correct to the converted pixel gray reference voltage.

The operational amplifier module 540 enlarges the obtained pixel gray voltage and the operational amplifier module outputs the enlarged pixel gray voltage to the data lines D1 to Dm. It should be noted, if the pixel gray voltage obtained by the D/A converter module 530 can driving each pixel PX display properly, this operational amplifier module 540 may be omitted.

In summary, according to the liquid crystal display device of the embodiment of the present disclosure, when the gamma correction can be performed, the P-Gamma circuit is omitted, greatly reducing the cost of production, so as to enhance market competitiveness.

Although reference to particular embodiments shown and described the present disclosure, those skilled in the art will understand: without departing from the spirit and scope of the appended claims and their equivalents of the present disclosure, a case, in this that various changes in form and details.

What is claimed is:

1. A driving system of the liquid crystal display device, wherein, the driving system comprises:
   a timing control circuit for storing a data converted to gamma voltage is used to generate a data converted to pixel gray reference voltage, wherein the timing control circuit comprises a storage module and a timing control module, the storage module stores the data converted to gamma voltage and is connected to the timing control module, and the timing control module receives an input image signal from an external graphics controller and processes the input image signal to generate the data converted to pixel gray reference voltage, wherein the data converted to gamma voltage is different from the input image signal, and the data converted to gamma voltage is different from the data converted to pixel gray reference voltage; and
   a data driving circuit for receiving the data converted to gamma voltage and the data converted to pixel gray reference voltage from the timing control circuit is used to convert the data converted to gamma voltage and the data converted to pixel gray reference voltage to a gamma voltage and a pixel gray reference voltage respectively and is used to obtain a pixel gray voltage by the converted gamma voltage gamma correct to the converted pixel gray reference voltage, wherein the data driving circuit comprises a first line storage module, a second line storage module and a D/A converter module, the first line storage module receives the data converted to pixel gray reference voltage from the timing control circuit and stores the data converted to pixel gray reference voltage, the second line storage module receives the data converted to gamma voltage from the timing control circuit and stores the data converted to gamma voltage, and the D/A converter module is connected to the first line storage module and the second line storage module to receive the data converted to pixel gray reference voltage and the data converted to gamma voltage therefrom and is used to obtain the pixel gray voltage by the converted gamma voltage gamma correct to the converted pixel gray reference voltage.

2. The driving system according to claim 1, wherein, the data driving circuit further comprises: an operational amplifier module for enlarging the pixel gray voltage is used to output the amplified pixel gray voltage.

3. The driving system according to claim 1, wherein, the data is transported between the timing control circuit and the data driving circuit through an IIC communication protocol.

4. A liquid crystal display device comprising a driving system, wherein the driving system comprises:
   a timing control circuit for storing a data converted to gamma voltage is used to generate a data converted to pixel gray reference voltage, wherein the timing control circuit comprises a storage module and a timing control module, the storage module stores the data converted to gamma voltage and is connected to the timing control module, and the timing control module receives an input image signal from an external graphics controller and processes the input image signal to generate the data converted to pixel gray reference voltage, wherein the data converted to gamma voltage is different from the input image signal, and the data converted to gamma voltage is different from the data converted to pixel gray reference voltage; and
   a data driving circuit for receiving the data converted to gamma voltage and the data converted to pixel gray reference voltage from the timing control circuit is used to convert the data converted to gamma voltage and the data converted to pixel gray reference voltage to a gamma voltage and a pixel gray reference voltage respectively and is used to obtain a pixel gray voltage by the converted gamma voltage gamma correct to the converted pixel gray reference voltage, wherein the data driving circuit comprises a first line storage module, a second line storage module and a D/A converter module, the first line storage module receives the data converted to pixel gray reference voltage from the timing control circuit and stores the data converted to pixel gray reference voltage, the second line storage module receives the data converted to gamma voltage from the timing control circuit and stores the data converted to gamma voltage, and the D/A converter module is connected to the first line storage module and the second line storage module to receive the data converted to pixel gray reference voltage and the data converted to gamma voltage therefrom and is used to obtain the pixel gray voltage by the converted gamma voltage gamma correct to the converted pixel gray reference voltage.

* * * * *